United States Patent [19]

Krummel

[11] Patent Number: 4,996,462

[45] Date of Patent: Feb. 26, 1991

[54] ELECTRONIC BALLAST FOR FLUOROSCENT LAMPS

[75] Inventor: Peter Krummel, St. Georgen, Fed. Rep. of Germany

[73] Assignee: Siemens Aktiengesellschaft, Berlin and Munich, Fed. Rep. of Germany

[21] Appl. No.: 360,782

[22] Filed: Jun. 2, 1989

[30] Foreign Application Priority Data

Jul. 27, 1988 [DE] Fed. Rep. of Germany ....... 3825513

[51] Int. Cl.[5] ...................... H05B 37/02; H05B 39/00; H02M 7/5387

[52] U.S. Cl. ................................ 315/209 R; 315/246; 315/DIG. 5; 315/DIG. 7; 315/208; 315/244; 363/132

[58] Field of Search .................... 315/209 R, 244, 246, 315/227 R, DIG. 5, DIG. 7, 208; 363/132, 136

[56] References Cited

U.S. PATENT DOCUMENTS 4,511,823 4/1985 Eaton et al. .................. 315/DIG. 7
4,553,070 11/1985 Sairanen et al. ................ 315/209 R

FOREIGN PATENT DOCUMENTS 0121917 10/1984 European Pat. Off. .
WO85/04769 10/1985 PCT Int'l Appl. .

OTHER PUBLICATIONS

"Vorschaltgerate und Schaltungen fur Niederspannungs-Entladungslampen" by C. H. Sturm, Brown Boverie & Cie AG, Mannheim, 5. Auflage, 1974, Seiten 343 und 345.

*Primary Examiner*—Eugene R. LaRoche
*Assistant Examiner*—Michael B. Shingleton
*Attorney, Agent, or Firm*—Hill, Van Santen, Steadman & Simpson

[57] ABSTRACT

Electronic ballasts are essentially composed of a series connection of a harmonic filter that has its input side connected to the AC line, a rectifier and an inverter to which is connected at least one load circuit composed of a series circuit of an inductor and a parallel circuit composed of a fluorescent tube and a capacitor. When a high electric tolerance is required of such a ballast in view of a desired increase in the power factor, standard circuit designs required a relatively expensive storage capacitor that smooths the AC rectified line voltage. In order to be able to use a storage capacitor that has a lower electric tolerance in comparison to the required voltage tolerance of the ballast, a storage capacitor is incorporated into one of the two capacitor branches of the inverter which is composed of a switch bridge arrangement having two switch branches and two capacitor branches, this storage capacitor being connected in series with the actual load.

5 Claims, 4 Drawing Sheets

ELECTRONIC BALLAST FOR FLUOROSCENT LAMPS

BACKGROUND OF THE INVENTION

The present invention is directed to an electronic ballast for fluorescent lamps, and in particular electronic ballasts having an inverter that has it input side connected to an AC source via a series connection of a harmonic filter and of a rectifier. Such an electronic ballast has its output side connected to at least one load circuit composed of a series circuit of an inductor and a parallel circuit of a capacitor and a fluorescent lamp. An inverter in the electronic ballast is designed as a switch bridge arrangement having two switch branches and two capacitor branches whose bridge terminals which form the output of the inverter are formed, first, by the common junctions of the two switch branches and, second, by the two capacitor branches, whereby the two switch branches are composed of electronic switches having freewheeling diodes connected in parallel, these switches being opened and closed in push-pull fashion having a switching frequency that is high in comparison to the alternating frequency of the AC source.

A prior art electronic ballasts of this type are disclosed, for example, by the European reference EP 0 121 917 A1. The switch bridge arrangement used has only one capacitor branch. This, however, is only an economic structure of such a switch bridge arrangement as shown, for example, by the reference of C. H. Sturm, "Vorschaltgeraete und Schaltungen fuer Niederspannungs-Entladungslampen", Brown, Boveri & Cie AG, Mannheim 5th Edition, 1974, pages 343 and 344.

High-voltage electrolyte capacitors which are used in such electronic ballasts for smoothing the rectified line alternating current are designed for a direct voltage of 450 V and represent a standard that has been tested extensively. This electrical voltage of 450 V DC is completely adequate in view of a peak line voltage of 439 V that results from a line alternating voltage of 277 V plus or minus 12%. When, however, additional measures are taken for increasing the power factor, then either a high-voltage electrolyte capacitor having a significantly higher direct voltage tolerance or, two series-connected electrolyte capacitors must be utilized. The series connection of two electrolyte capacitors, however, also increases the costs of such an electronic ballast and also causes additional losses in view of the necessary compensation of leakage current.

SUMMARY OF THE INVENTION

An object of the present invention is to provide an electronic ballast of the type initially cited that has an electric tolerance of at least 750 V in view of an increase in the power factor and utilizes only one high-voltage electrolyte capacitor having a standard electric rating of 450 V DC.

In an electronic ballast of the present invention, this object is achieved by an electronic ballast for fluorescent lamp, having an inverter that has its input side connected to an AC line via a series connection of a harmonic filter and a rectifier and that has its output side connected to at least one load circuit composed of a series circuit of an inductor and a parallel circuit composed of a capacitor and of a fluorescent lamp. The inverter is fashioned as a switch bridge arrangement having two switch branches and two capacitor branches whose bridge terminals forming the output of the inverter are formed by the common junction of the two switch branches and by the common junction of the two capacitor branches. The two switch branches are composed of electronic switches having freewheeling diodes connected in parallel with the electronic switches, the switches being opened and closed in a push-pull fashion with a switching frequency that is high in comparison to the AC line frequency. The electronic ballast has a storage capacitor required for the smoothing of the AC rectified line voltage connected in one of the capacitor branches of the switch bridge arrangement. The storage capacitor has a value such that it is not fully charge-reversible at the line AC frequency. Another capacitor in the other capacitor branch has a freewheeling diode connected parallel thereto and is only of such a size that is fully charge-reversible at the switching frequency of the switches. An auxiliary inductor is connected in the connecting path between the rectifier and the inverter. The harmonic filter has at least a filter inductor in at least a parallel arm thereof, the filter inductor in the parallel arm at an output side of the harmonic filter being effective across the rectifier as a preceding inductance for the inverter.

The present invention is based on the critical perception that the storage capacitor required for smoothing the rectified alternating voltage need not be connected in parallel to the rectifier output but can also be connected in series with the load circuit. This means that the rectified AC voltage now occurs at the series connection of the two capacitor branches of the switch bridge arrangement and the high-voltage electrolyte capacitor can have a significantly lower electric rating than the electric tolerance required for the circuit. What is important in this context is that the other capacitor branch of the switch bridge arrangement need not be an electrolyte capacitor, since the capacitor in this capacitor branch need only be dimensioned for a value at which its charge reversal is guaranteed at the switching frequency. In other words, the capacitor of this capacitor branch is several orders of magnitude smaller than the capacitor in the other capacitor branch that has the high-voltage electrolyte capacitor. Thus, the series circuit of the capacitors in the two capacitor branches does not require any compensation for leakage current.

Compared to known circuit arrangements of this type, the circuit of the present invention requires a freewheeling diode only in parallel to the capacitor branch that does not have the high-voltage electrolyte capacitor. This freewheeling diode assures that the current in the load circuit does not go to zero at the zero crossings of the AC line voltage.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

FIGS. 1 through 8 and 11 each respectively show the circuit of an electronic ballast composed of a series connection of a harmonic filter HF that has its input side connected to the line voltage N, of a rectifier GL and of an inverter WR whose load circuit is composed of an inductor L in series with a parallel circuit composed of a fluorescent lamp LL and of an ignition capacitor Cz.

The inverter WR itself represents a switch bridge arrangement having two switch branches and two capacitor branches. The first switch branch is formed by an electronically controlled switch T1 and the second switch branch is formed by an electronically controlled switch T2. In a corresponding fashion, the first capacitor branch is formed by the capacitor C1 and the second capacitor branch is formed by the capacitor C2. The capacitor C2 is a high-voltage electrolyte capacitor that is selected of such size in view of the rectified AC line voltage that it is not fully charge-reversible at the AC line frequency. The capacitor C1 is much smaller in value than the capacitor C2 and is dimensioned such that it can be fully charge-reversed during the alternating of the switches T1 and T2 that are opened and closed with a switching frequency that is much higher in comparison to the AC line frequency.

The inverter further has three freewheeling diodes D1, D2 and D3. The freewheeling diode D1 is connected in parallel to the switch T1, the freewheeling diode D2 is connected in parallel to the switch T2 and the freewheeling diode D3 is connected in parallel to the capacitor C1. The freewheeling diodes D1 through D3 are each respectively polarized such that they are biased in a non-conducting direction by the rectified AC voltage at the output of the rectifier GL. FIGS. 1 through 8 and 11 further depict the current flowing through the inductor as IL and the voltages across the switch T1 and the capacitor C3 by arrows U21 and U22, respectively.

Figure 9:
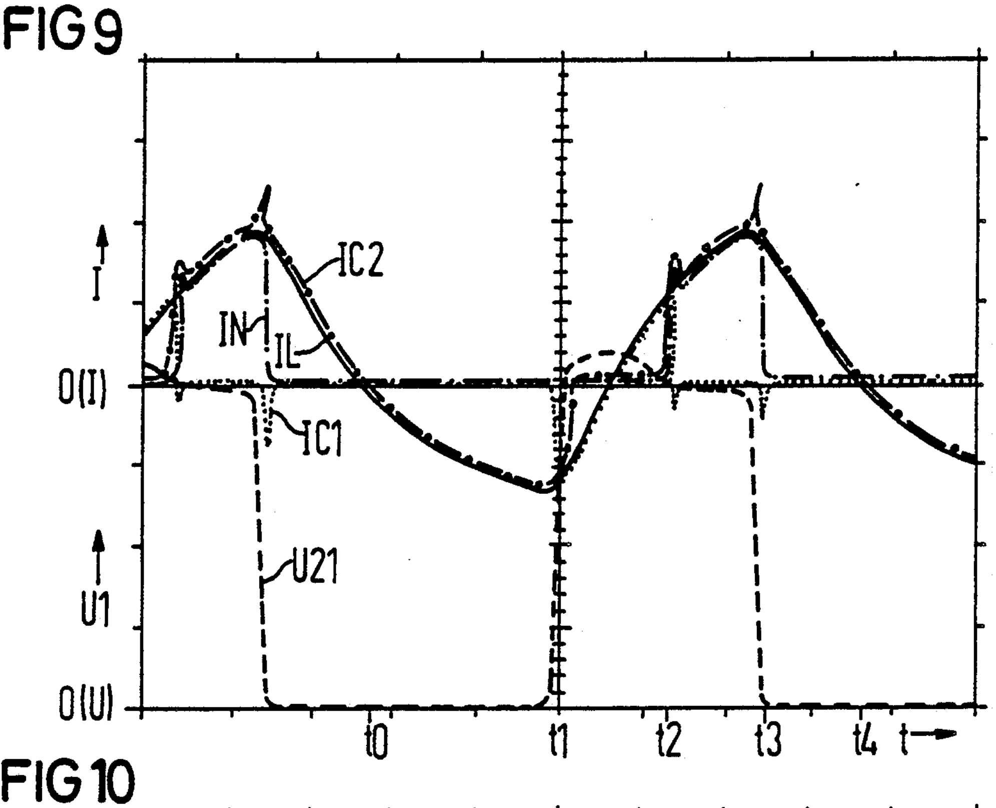
FIG. 9 is a current/voltage time diagram corresponding to FIGS. 1 through 4.

The circuit diagrams of FIGS. 1 through 4 that set forth the functioning of the ballast and correspond to the individual switch phases of the switches T1 and T2 are directed to that instance wherein the level of the line voltage N is higher than the voltage U22 across the capacitor C2. FIG. 9 shows the current/voltage time diagram corresponding to there figures. In the diagram of FIG. 9, the current IN through the inductor L is referenced with a solid line, the rectified current IN deriving from the line current is referenced with a dot-dash line, the current IC1 through the capacitor C1 is referenced with a dotted line, the current IC2 through the capacitor C2 is referenced with a line interrupted by circles and the voltage U21 across the switch T2 is referenced with a dashed line.

Figure 1:
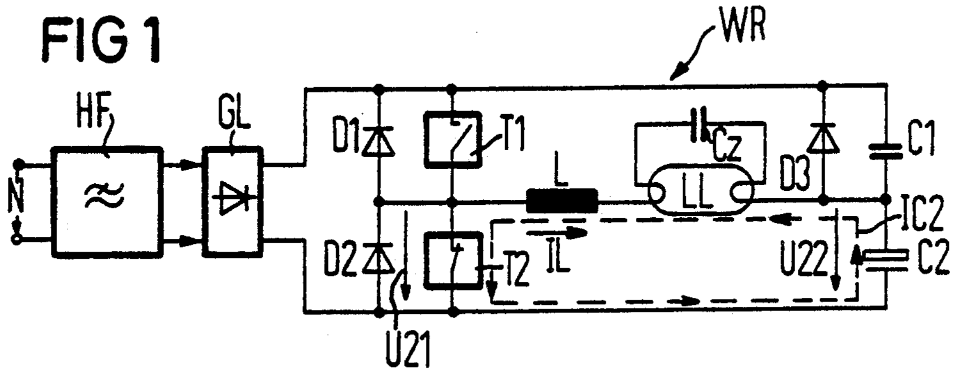
FIG. 1 through FIG. 4 are circuit diagrams depicting the functioning of the circuit of the present invention in the individual switching phases of the switch bridge arrangement in that instance wherein the level of the AC line voltage is greater than the voltage at the high-voltage electrolyte capacitor.

FIG. 1 shows that phase wherein the switch T1 is opened and the switch T2 is closed. At point in time t0 according to FIG. 9, the current IL through the inductor L, this current being equal to the current IC2, passes through zero and reverses its direction. The current IC2 flows out of the capacitor C2 through the fluorescent tube LL, the inductor L, the switch T1 and back to the capacitor C2. The capacitor C2 is thereby somewhat discharged and the inductor L ,is simultaneously charged.

Figure 2:
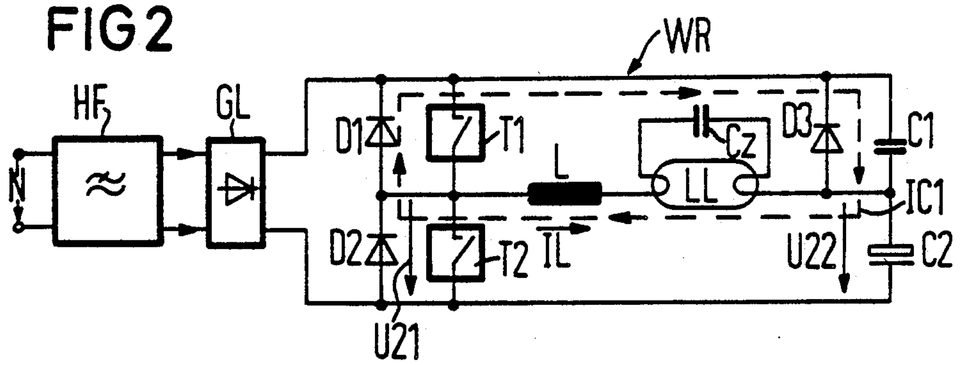

In the short switch phase following thereupon that is shown in FIG. 2 and in which both switches T1 and T2 are opened, the energy stored in the inductor L discharges in the form of the current IC1 via the freewheeling diode D1, the capacitor C1, the fluorescent tube LL and the inductor L. The capacitor C1 is thereby charged and the voltage at the series circuit of the capacitors C1 and C2 rises above the momentary value of the AC line N. The rectifier GL thereby remains inhibited. In the diagram of FIG. 9, this corresponds to the time range around point in time t1.

Figure 3:
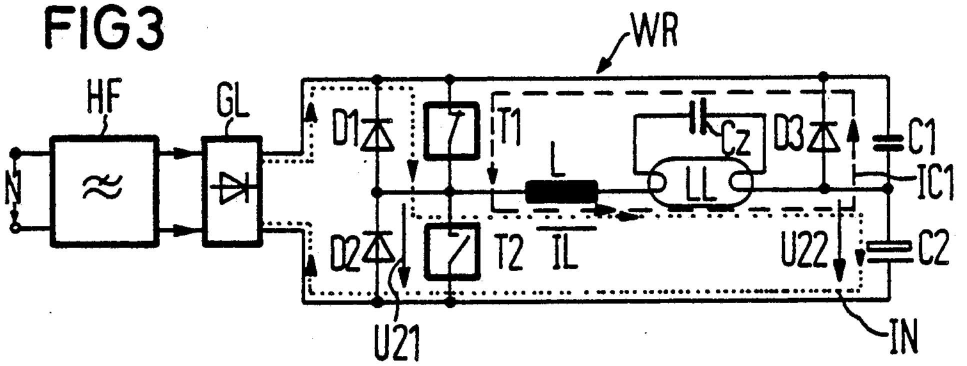

In the following time interval between points t1 and t3, the switch positions of the switches T1 and T2 corresponding to FIG. 1 reverse. This case is shown in FIG. 3. The switch t1 that is now closed initiates a current IC1 that flows from the capacitor C1 via the switch T1, the inductor L and the fluorescent tube LL back to the capacitor C1. The capacitor C1 thereby discharges. The voltage at the series circuit of the capacitors C1 and C2 thereby decreases. As soon as the voltage at the series circuit of the capacitors C1 and C2 decreases below the momentary amount of the AC line N, the rectifier GL becomes conductive and the current IN flows from the line N via the switch T1, the inductor L, the fluorescent tube LL, the capacitor C2 back into the line N during the time interval between t2 and t3 as shown in the time diagram in FIG. 9. In contrast to the current IC1 illustrated with a broken line, the current IN is illustrated with a dotted line in FIG. 3.

Figure 4:
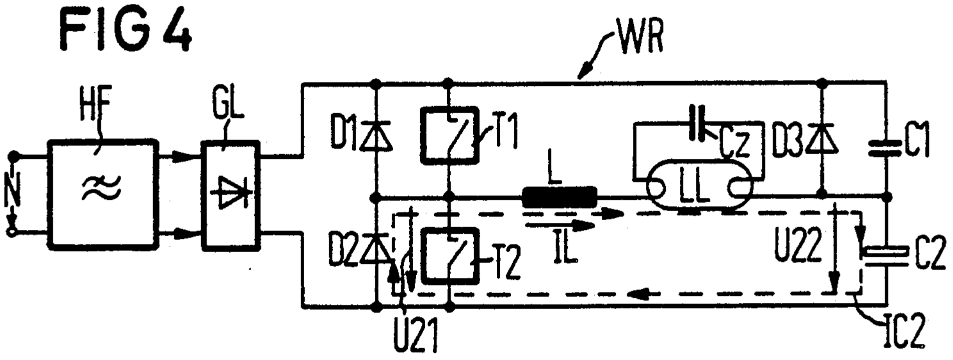

At point in time T3 according to the diagram of FIG. 9, both switches T1 and T2 return to the open condition. This switch situation is shown in FIG. 4. The current from the line N proceeds toward zero and the energy stored in the inductor L in the form of the current IC2 via the fluorescent tube LL, the capacitor C2 and the freewheeling diode D2. In the following phase wherein the switch T2 is closed, the current IC2 that is identical to the current IL through the inductor L first approaches zero before reversing, as has already been set forth in conjunction with FIG. 1.

FIGS. 5 through 8, corresponding to FIGS. 1 through 4, set forth the functioning of the ballast in instances wherein the level of the AC line is less than or equal to the voltage U22 at the capacitor C2.

Figure 10:
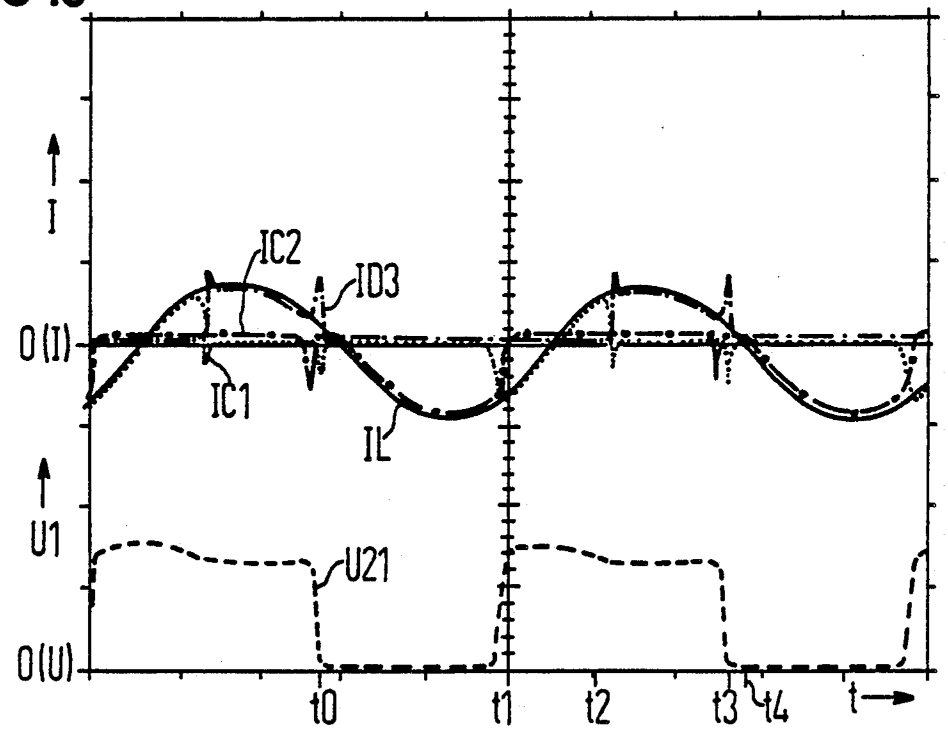
FIG. 10 is a current/voltage time diagram corresponding to the FIGS. 5 through 8.

FIG. 10 shows the associated current/voltage time diagram for the currents IL, IC1, IC2 and ID3 as well as of the voltage U21. What is thereby the determining factor is again the time span between t0 and t4. Again, the current IL is indicated by a solid line, the current IC1 is indicated by a dotted line, the current IC2 is indicated by a line interrupted by circles, the current ID3 is indicated by a dot-dash line and the voltage U21 is indicated by a dashed line.

Figure 5:
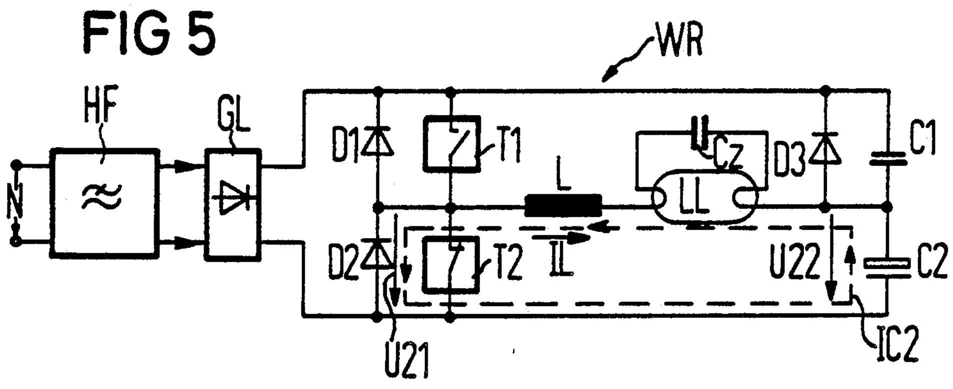
FIG. 5 through FIG. 8 are circuit diagrams depicting the functioning circuit of the present invention in the individual switch phases of the switch bridge arrangement in that instance wherein the level of the AC line voltage is smaller than the voltage at the high-voltage electrolyte capacitor.

As shown in FIG. 5 the current IC2 flows when the switch T1 is opened and the switch T2 is closed. The course in this switching phase is shown in FIG. 10 in the time interval from t0 through t1. The current IC2 flows out of the capacitor C2 through the fluorescent tube LL, the inductor L, the switch T2 and back to the capacitor C2. The capacitor C2 is thereby somewhat discharged and the inductor L is charged.

Figure 6:
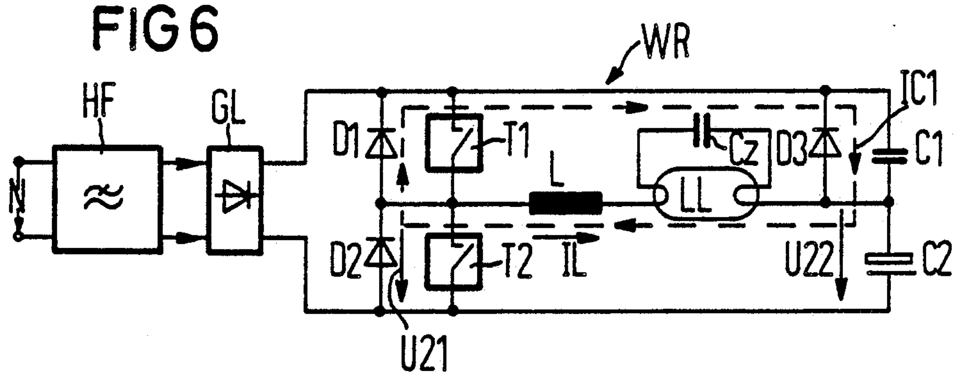
Figure 7:
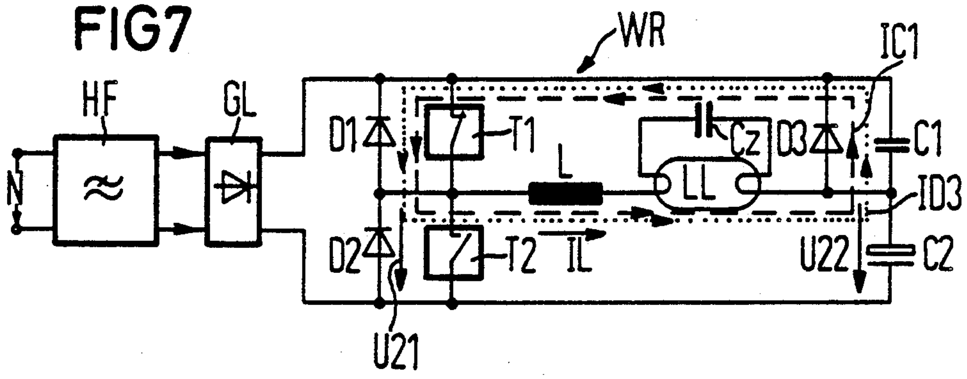

In the brief switching phase in the time interval around t1 as shown in FIG. 10 and FIG. 6 and wherein the two switches T1 and T2 are opened, the energy stored in the inductor L discharges in the form of the current IC1 via the freewheeling diode D1, the capacitor C1 and the fluorescent tube LL. The capacitor C1 is thereby charged. In the following switch phase that is shown in FIG. 7 and wherein the switch T2 is opened and the switch T1 is closed, a current initially flows out of the capacitor C1 in the time interval t1 through t2 as shown in FIG. 10 via the switch T1, the inductor L and the fluorescent tube LL and back to the capacitor C1. The inductor L is thereby charged and the capacitor C1 is discharged. At point in time t2 the capacitor C1 is discharged and the inductor L continues to partially discharge via the fluorescent tube LL, the freewheeling diode D3 and the switch T1 that is still conductive. In contrast to the current IC1, this current ID3 is shown with a dotted line in FIG. 7.

Figure 8:
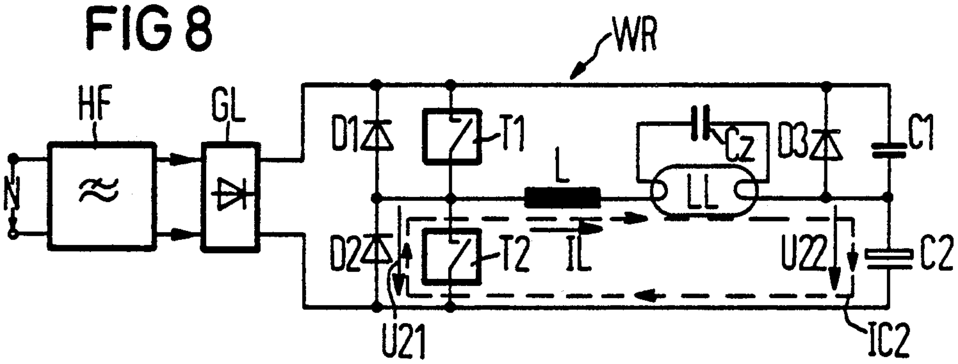

FIG. 8 shows the short switch phase that now follows in the time interval around the point in time t3 wherein both switches T1 and T2 are opened. The currents IC1 and ID3 according to FIG. 7 were interrupted when the switch T1 opened and the residual energy stored in the inductor L discharged via the fluorescent tube LL, the capacitor C2 and the freewheeling diode D2, discharging in the form of the current IC2. At point in time t4 wherein the current IL passes through zero and reverses, the switch T2 that is now again closed becomes effective as depicted in FIG. 5 with the conditions of current conduction as shown in FIG. 5 and occurs as has already been set forth above.

Figure 11:
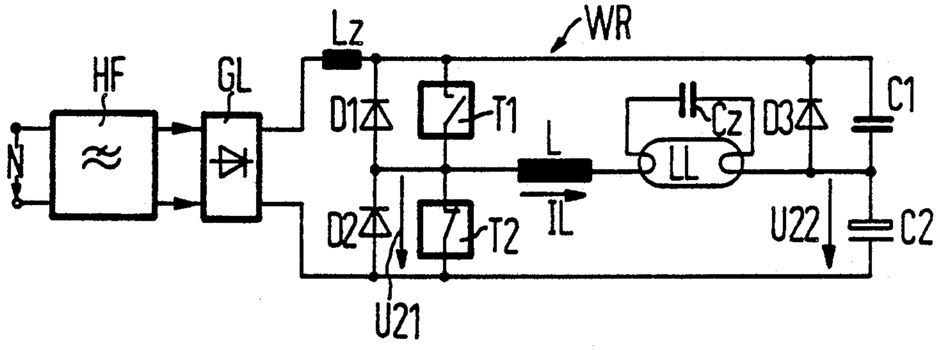
FIG. 11 is a circuit diagram depicting a modification of the circuit shown in FIGS. 1 through 8.

The circuit depicted in FIG. 11 differs from the circuits in FIGS. 1 through 8 in that an auxiliary inductor Lz is provided in the connecting path between the rectifier GL and the inverter WR. As investigations have shown, the inductively loaded input of the inverter WR. As investigations have shown, the inductively loaded input of the inverter achieves times and forms of current flow that have better noise suppression. It also becomes possible to select a smaller ignition capacitor Cz.

Figure 12:
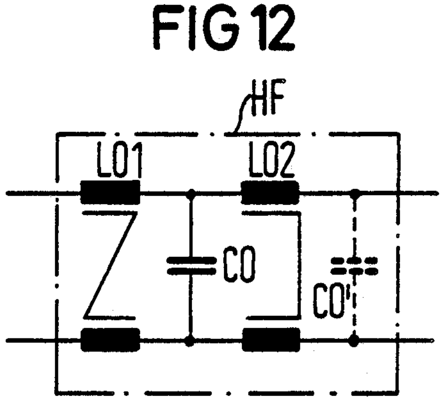
FIG. 12 is a circuit diagram depicting a special embodiment of a harmonic filter shown in FIGS. 1 through 8.

As shall be briefly set forth with reference to FIG. 12, the inductive load of the input of the inverter can also be produced without the auxiliary inductance Lz shown in FIG. 11. FIG. 12 shows a standard harmonic filter HF in the form of a symmetrical T-element having filter inductors LO1 and LO2 in parallel branches at the input side and output side and a filter capacitor CO in a shunt arm. As a shunt arm in such a harmonic filter HF, the filter capacitor CO′ is also additionally provided at the output side and provides an additional smoothing function for the harmonics. When the filter capacitor CO′ is omitted, than the filter inductor LO2 at the output side is effective in view of the input of the inverter WR, and thus represents an inductive input load that makes the auxiliary inductor Lz superfluous.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An electronic ballast for fluorescent lamps, having an inverter that has its input side connected to an AC line via a series connection of a harmonic filter and a rectifier and that has its output side connected to at least one load circuit composed of a series circuit of an inductor and a parallel circuit composed of a capacitor and of a fluorescent lamp, whereby the inverter is fashioned as a switch bridge arrangement having two switch branches and two capacitor branches whose bridge terminals forming the output of the inverter are formed by the common junction of the two switch branches and by the common junction of the two capacitor branches, and whereby the two switch branches are composed of electronic switches having freewheeling diodes connected in parallel with the electronic switches, the switches being opened and closed in a push-pull fashion with a switching frequency that is high in comparison to the AC line frequency , comprising a storage capacitor required for the smoothing of the AC rectified line voltage connected in one of the capacitor branches of the switch bridge arrangement; the storage capacitor having a value such that it is not fully charge-reversible at the line AC frequency, whereas another capacitor in the other capacitor branch has a freewheeling diode connected parallel thereto and is only of such a size that is-fully charge-reversible at the switching frequency of the switches.

2. The electronic ballast means according to claim 1, wherein an auxiliary inductor is connected in the connecting path between the rectifier and the inverter.

3. The electronic ballast means according to claim 1, wherein the harmonic filter has at least a filter inductor in at least a parallel arm thereof and wherein the filter inductor in the parallel arm at an output side of the harmonic filter is effective across the rectifier as a preceding inductance for the inverter.

4. An electronic ballast for fluorescent lamps, having an inverter that has its input side connected to an AC line via a series connection of a harmonic filter and a rectifier and that has its output side connected to at least one load circuit composed of a series circuit of an inductor and a parallel circuit composed of a capacitor and of a fluorescent lamp, whereby the inverter is fashioned as a switch bridge arrangement having two switch branches and two capacitor branches whose bridge terminals forming the output of the inverter are formed by the common junction of the two switch branches and by the common junction of the two capacitor branches, and whereby the two switch branches are composed of electronic switches having freewheeling diodes connected in parallel with the electronic switches, the switches being opened and closed in a push-pull fashion with a switching frequency that is high in comparison to the AC line frequency, comprising a storage capacitor required for the smoothing of the AC rectified line voltage connected in one of the capacitor branches of the switch bridge arrangement; the storage capacitor having a value such that it is not fully charge-reversible at the line AC frequency, whereas another capacitor in the other capacitor branch has a freewheeling diode connected parallel thereto and is only of such a size that is fully charge-reversible at the switching frequency of the switches; an auxiliary inductor being connected in the connecting path between the rectifier and the inverter.

5. An electronic ballast for fluorescent lamps, having an inverter that has its input side connected to an AC line via a series connection of a harmonic filter and a rectifier and that has its output side connected to at least one load circuit composed of a series circuit of an inductor and a parallel circuit composed of a capacitor and of a fluorescent lamp, whereby the inverter is fashioned as a switch bridge arrangement having two switch branches and two capacitor branches whose bridge terminals forming the output of the inverter are formed by the common junction of the two switch branches and by the common junction of the two capacitor branches, and whereby the two switch branches are composed of electronic switches having freewheeling diodes connected in parallel with the electronic switches, the switches being opened and closed in a push-pull fashion with a switching frequency that is high in comparison to the AC line frequency, comprising a storage capacitor required for the smoothing of the AC rectified line voltage connected in one of the capacitor branches of the switch bridge arrangement; the storage capacitor having a value such that it is not fully charge-reversible at the line AC frequency, whereas another capacitor in the other capacitor branch has a freewheeling diode connected parallel thereto and is only of such a size that is fully charge-reversible at the switching frequency of the switches; the harmonic filter having at least a filter inductor in at least a parallel arm thereof, the filter inductor in the parallel arm at an output side of the harmonic filter being effective across the rectifier as a preceding inductance for the inverter.

* * * * *